Jan. 1, 1929.

C. R. SHORT

RESILIENT CONNECTER

Filed Dec. 11, 1924

1,697,787

Inventor
Charles R. Short
By his Attorneys

Patented Jan. 1, 1929.

1,697,787

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

RESILIENT CONNECTER.

Application filed December 11, 1924. Serial No. 755,215.

This invention relates to resilient members designed to connect or be interposed between parts having a limited movement in respect to each other in order to absorb vibration and prevent noise. It is particularly intended for use on vehicles as a spring connecter, shackle, or wherever a strong yieldable connection is desired.

Its object is to impart durability and effectiveness to resilient connecters of the described type.

The invention comprises an elastic element made at least in part of rubber, vulcanized and molded into a form having enlarged heads or end portions connected by a constricted body, the heads or end portions being fitted into cups having reduced necks which are separated from each other so as to leave unconfined only a narrow zone of the elastic element.

In the accompanying drawings, in which like reference characters indicate like parts throughout the several views.

Figure 1:
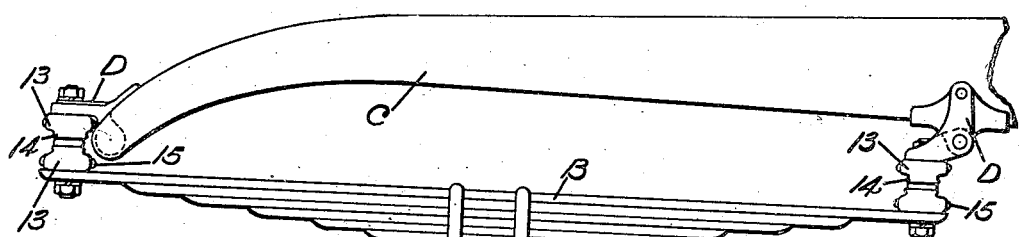
Fig. 1 is a side elevation showing two resilient connecters made in accordance with this invention used as spring shackles or connecters interposed between a leaf spring and a frame sill of a vehicle.
Figure 2:
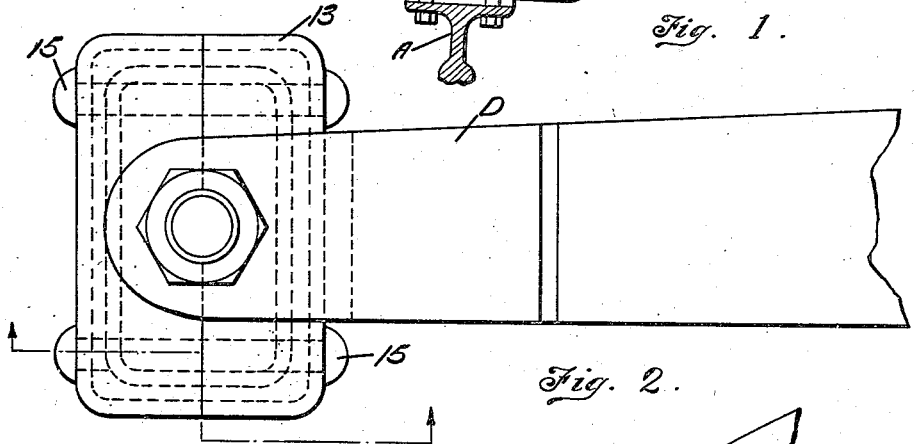
Fig. 2 is a plan view on an enlarged scale of the parts shown in elevation at the left of Fig. 1.

The elastic element or part 10 of the connecter, constituting the subject matter of this invention, is preferably composed of alternate layers of rubber and textile fabric, the rubber layers being indicated by the numeral 11 and the fabric layers by numeral 12. In this particular instance, there is a layer of rubber on the exterior as shown, although, of course, the layers may be so arranged that layers of fabric are exposed on the exterior. The layers of fabric may be first rubberized, if desired, and then matched or assembled with layers of rubber compounded in such manner as to give the desired degree of resiliency. When a sufficient number of layers have been assembled to produce a block of a desired size, this block may be placed in a mold, cured and molded under pressure in a manner familiar to workers in rubber. The mold has such form as to produce an object shaped somewhat like an hour-glass—that is, having opposite enlarged heads or ends connected by a somewhat constricted body portion having, however, a cross section adequate to withstand the strains to which the connecter will be subjected in use.

Embracing the enlarged ends or heads of the elastic element are metal caps 13, having constricted necks 14. The caps fit snugly over the enlarged ends or heads of the elastic element. The heads may be inserted into the caps by compressing the heads and forcing the compressed heads through the reduced necks, and allowing them to expand in the interior of the caps. The caps are fastened to the enlarged ends by pins, such as bolts or rivets 15 which extend transversely through the sides of the caps and through the layers of rubber and fabric in the elastic member in a direction perpendicular to said layers. In the form shown two of these pins 15 are used to secure each cap to the elastic element and they are placed symmetrically, one on each side of a vertical center plane perpendicular to the layers.

Fastening means for attaching the elastic connecter to the external members to which the connecters are to be attached may be inserted in each cap, preferably before assemblage with the elastic element. In the form shown, each fastening member consists of a headed bolt 16, the shank of which passes through an opening in the center of the cap, the head of the bolt engaging the interior surface of the cap and being fitted in a socket formed in the elastic element 10. In the application of the invention shown in Fig. 1, the connecters serve as spring shackles, one attaching bolt being passed through a hole in a leaf spring and the other through a hole in a bracket fitted to a frame sill. In Fig. 1 A may represent an axle of a motor vehicle; B a leaf spring secured to the axle; C a sill member and D brackets fastened to the sill member to which the connecters are secured.

Figure 3:
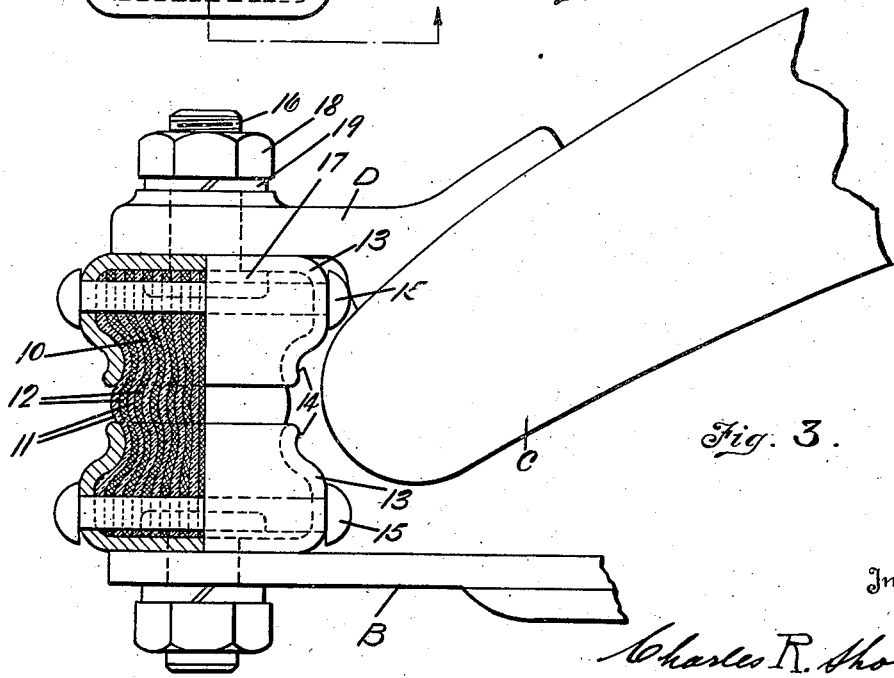
Fig. 3 is a side elevation, partly in section, on an enlarged scale, of the parts shown at the left of Fig. 1.

Referring to Fig. 3, the bolt 16 is passed through a hole formed in bracket D and the other through a like hole formed in one end of the longest of the leaf springs B, both the bracket and the spring coming into close contact with the outer surface of a cap 13. Nuts 18, screwed upon bolts 16, secure the connecter to the spring and bracket. A lock washer, 19, may be placed between each nut and the bracket or spring as shown.

The necks 14 of the caps 13 are preferably flared outward and slightly rounded to avoid, as much as possible, the edges of said neck from cutting and wearing the elastic member at the line of contact. A median narrow zone of the elastic body is left exposed so that the effective elasticity of the connecter is confined to that portion of the body lying between the edges of the necks of the caps, which is susceptible of being deformed by the forces acting on the connecter. This makes an extremely strong and efficient spring connecter.

While the form of embodiment of the invention as herein shown and described constitutes a preferred form, it is to be understood that other forms might be adopted, all coming within the scope of the claims which follow.

What is claimed and desired to be secured by Letters Patent is:

1. For use in connecting the chassis frame and the supporting spring of a vehicle, a deformable elastic load supporting cushion, caps snugly engaging its ends and extending to positions adjacent each other, the portion of the cushion between the caps being deformable under compression to support a load, and a flexible inelastic member incorporated in the cushion to resist side thrusts.

2. For use in connecting the chassis frame and the supporting spring of a vehicle, a deformable elastic load supporting cushion, caps snugly engaging its ends and extending to positions adjacent each other, the portion between the caps being deformable under compression to support a load, and a flexible fabric incorporated in the cushion.

3. For use in connecting the chassis frame and the supporting spring of a vehicle, a load supporting cushion consisting of an elastic member resisting compression pressure by deformation, and flexible inelastic means incorporated in the cushion to resist lateral thrusts.

In testimony whereof I hereto affix my signature.

CHARLES R. SHORT.